United States Patent [19]

Jung et al.

[11] 4,274,921

[45] Jun. 23, 1981

[54] FUEL ASSEMBLY FOR FAST NUCLEAR REACTORS

[75] Inventors: Wilfried Jung, Erlangen; Peter Rau, Mittelehrenbach bei Forchheim, both of Fed. Rep. of Germany

[73] Assignee: Kraftwerk Union Aktiengesellschaft, Mülheim, Fed. Rep. of Germany

[21] Appl. No.: 967,084

[22] Filed: Dec. 6, 1978

[30] Foreign Application Priority Data

Dec. 22, 1977 [DE] Fed. Rep. of Germany ....... 2757396

[51] Int. Cl.³ .............................................. G21C 3/30
[52] U.S. Cl. ...................................... 176/78; 176/17; 176/58 R
[58] Field of Search ................... 176/78, 76, 58 R, 59, 176/40, 50, 17, 18

[56] References Cited

U.S. PATENT DOCUMENTS

| 3,366,546 | 1/1968 | Anthony | 176/40 |
| 3,546,068 | 12/1970 | Schluderberg | 176/78 |
| 3,625,822 | 12/1971 | Mantle | 176/78 |
| 3,798,124 | 3/1974 | Noyes | 176/78 |
| 3,844,886 | 10/1974 | Crowtner | 176/17 |
| 4,056,440 | 11/1977 | MacBeth | 176/78 |

FOREIGN PATENT DOCUMENTS 1000780 8/1965 United Kingdom ..................... 176/18

*Primary Examiner*—Donald P. Walsh
*Attorney, Agent, or Firm*—Herbert L. Lerner

[57] ABSTRACT

Fuel assembly for fast nuclear reactors includes a cluster of parallel-disposed fuel rods, and a casing surrounding the fuel rods and defining a coolant flow configuration, the fuel rods being disposed in a manner that the axes thereof intersect imaginary coaxial circles, and the casing being of circular cylindrical shape.

5 Claims, 5 Drawing Figures

FUEL ASSEMBLY FOR FAST NUCLEAR REACTORS

The invention of the instant application relates to a fuel assembly for fast nuclear reactors, especially of the gas-cooled type, which is formed of a cluster of fuel rods disposed parallel to one another and enclosed by a casing or box serving to guide coolant flow. At the present state of the art of fast nuclear reactors, it is generally known that the fuel assemblies are enclosed by boxes or chests for guiding coolant flow. Each fuel assembly therefore has a separate, adjustable coolant flow configuration, which is necessary for ensuring reliable heat removal from the fuel assemblies that are extremely highly stressed thermally. In general, the fuel element boxes or chests are of hexagonal cross section, since such a cross section is readily derived from the triangular division of the fuel rod grid. This triangular division is selected because the rod spacing, for the same flow area, is considerably greater than, for example, with the square pitch customary in pressurized-water reactors.

Since, as aforementioned, the boxes serve to conduct the flows in the fuel assembly so that all of the rods therein are subject to the same cooling conditions, it is necessary to manufacture the hexagonal boxes with great precision. With a rod spacing of theoretically 1.12 mm between the casing tube and the inner surface of the box, an accuracy of +1 mm, which is currently attainable for hexagonal tubes of about 170 mm width across the flats, already means a considerable increase in the outer-lying subchannels. This results in a flow distribution within the fuel assembly, by means of which the inner rods are cooled relatively less than the outer rods. Currently, this effect is taken into consideration in the layout or construction of the fuel assembly.

During the life or duration of such an hexagonal fuel assembly, there is the danger that the fuel element will tend to deform to a circular cross-sectional shape as much as possible due to internal pressure exerted therein. Even though the elastic expansion is insignificant, a plastic deformation which increases during the life time can result, however, from creep due to irradiation and temperature.

Increases of the width across the flats by more than 1 mm, however, which must be expected, render the homogeneous cooling of the fuel rod cluster questionable.

It follows therefrom that, in the heretofore conventional hexagonal boxes, dimensional accuracy can be ensured only by increasing the wall thickness accordingly. This, however, not only makes the manufacture of the fuel assemblies more expensive but also involves neutron-physical disadvantages.

It is accordingly and object of the invention to provide a fuel assembly for fast nuclear reactors that is of such shape that the hereinaforementioned difficulties do not occur or are very considerably reduced and which, in addition, affords simpler and more accurate production possibilities than heretofore, together with an effective conservation of material.

With the foregoing and other objects in view, there is provided, in accordance with the invention, a fuel assembly for fast nuclear reactors comprising a cluster of parallel-disposed fuel rods and a casing surrounding the fuel rods and defining a coolant flow configuration, the fuel rods being disposed in a manner that the axes thereof intersect imaginary coaxial circles, and the casing being of circular cylindrical shape.

In accordance with another feature of the invention, the fuel rod axes are disposed on V-shaped lines extending symmetrically from the center of the fuel assembly and constituting radii defining an angle of 60°.

In accordance with a further feature of the invention coolant subchannels extend in the middle of the cluster and are bordered by fuel rods of reduced output.

In accordance with an additional feature of the invention, the fuel rods of reduced output have a lower enrichment than the remaining fuel rods of the fuel assembly.

In accordance with an added feature of the invention, a central guide tube is disposed coaxially to the casing, and a breedermaterial element is received in the interior of the central guide tube.

In accordance with a concomitant feature of the invention, a central guide tube is disposed coaxially to the casing, and a control element formed of absorber material is axially adjustably disposed in the interior of the central guide tube.

Other features which are considered as characteristic for the invention are set forth in the appended claims.

Although the invention is illustrated and described herein as embodied in a fuel assembly for fast nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
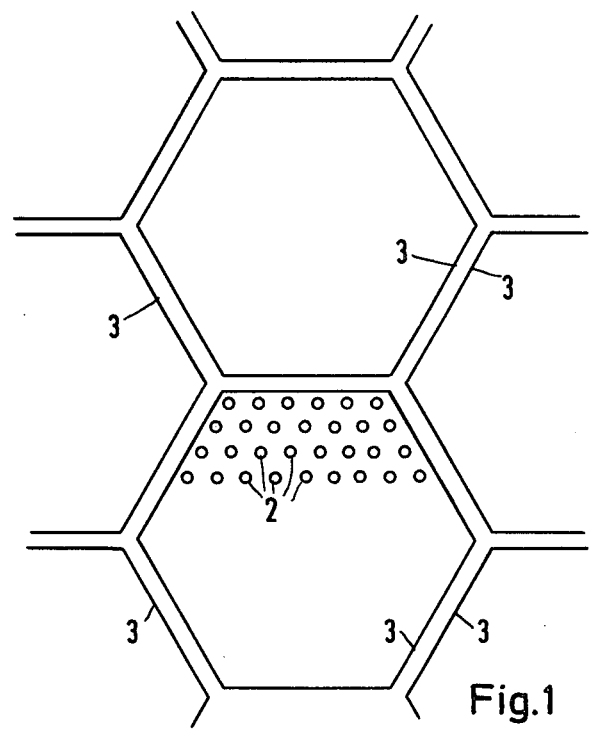
FIG. 1 is a fragmentary diagrammatic cross-sectional view of conventional fuel assemblies.

Referring now to the drawing and first, particularly, to FIG. 1 thereof, there is shown part of a reactor core having fuel assemblies of heretofore conventional construction. Each fuel assembly is surrounded by a hexagonal box or chest 3 and is formed of a large number of individual fuel rods 2 disposed in a triangular grid. The hexagonal fuel assemblies are disposed close to one another in the manner shown in FIG. 1 and thus form the reactor core per se. The individual fuel assemblies are obviously not stacked together without gaps, since they could otherwise note be assembled and disassembled without difficulty. The spacing between adjacent fuel assembly boxes or chests is about 3 to 5 mm. It consequently also affords the hereinaforedescribed plastic deformation, which can be kept within limits only by suitably increasing the thickness of the walls of the boxes 3.

Figure 2:
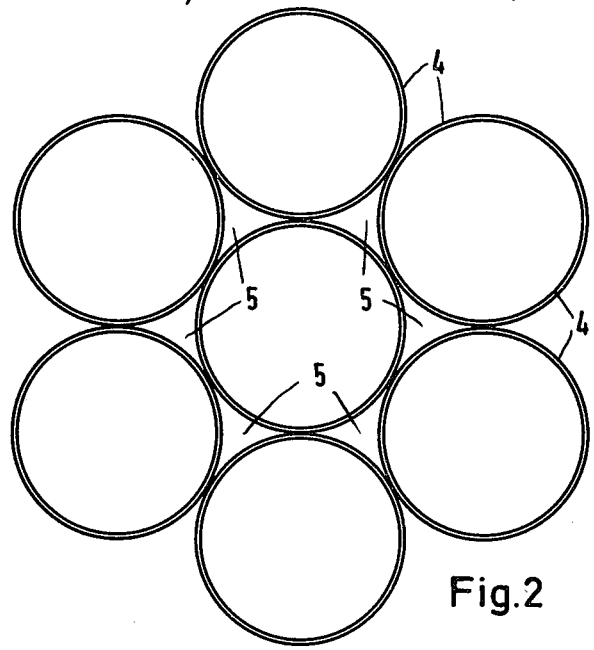
FIG. 2 is a view similar to that of FIG. 1 of a reactor core having fuel assemblies of circular cylindrical shape according to the invention of the instant application.

FIG. 2 shows the construction of a reactor core by means of fuel assembly boxes or chests 4 which are of circular cylindrical shape. From the viewpoint of strength, this is the optimal shape, so that, for the same strength, considerably smaller wall thicknesses are required. The wedge-shaped spaces 5 between the fuel assemblies are practically without significance from a neutron-physics point of view.

Figure 3:
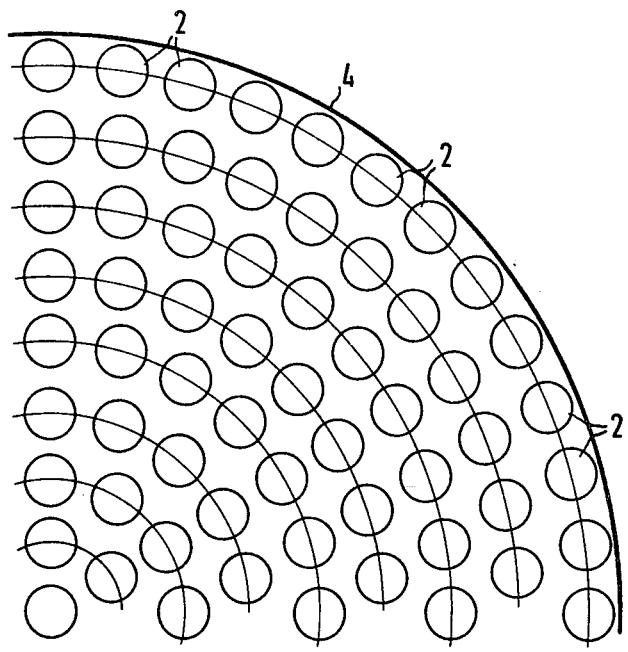
FIGS. 3 and 4 are fragmentary enlarged diagrammatic cross-sectional views of FIG. 2 showing two different modes of distribution of fuel rods within one of the boxes thereof.
Figure 4:
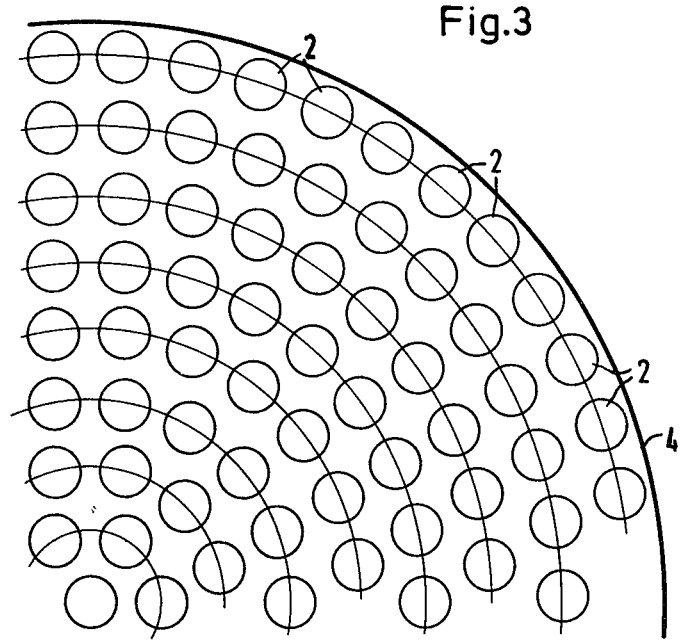

FIGS. 3 and 4 show two possible distributions or arrays of the fuel rods 2 within the boxes 4, all of the fuel rods 2 being located on concentric circles. A decided disadvantage of this fuel assembly construction appears initially to lie in the fact that, for the same flow cross section, in comparison to the state of the art, the area per fuel assembly, inclusive of the gaps therebetween, is about 5% greater. This increase in the total core volume by about 5% resulting from the use of round assemblies, however, is more than made up for the decrease in the steel content of the box or chest from 6% to 1.5% for round assemblies.

Depending upon the diameter of the round fuel assemblies, higher temperatures can develop in the central zone if fuel rods of the same enrichment are used. However, this can be prevented by appropriately large diameters of the fuel assemblies or by equipping the central zone with rods of lesser enrichment. It is also possible to provide a separate, correspondingly matching flow configuration for the central zone. This can be effected, for example, by appropriate formation of the coolant supply at the inlet thereof to the fuel assembly.

Figure 5:
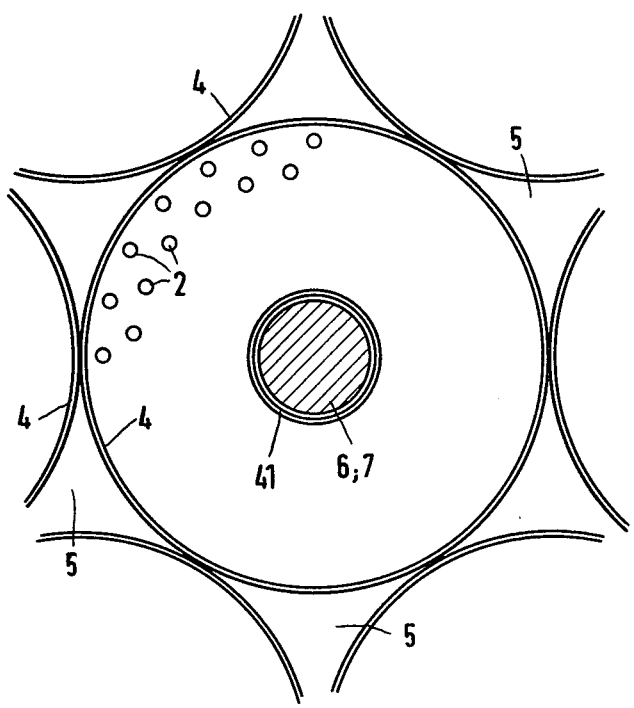
FIG. 5 is a fragmentary enlarged diagrammatic view of FIG. 2 though smaller in scale than that of FIGS. 3 and 4 showing yet another embodiment of the invention.

A further possibility, according to FIG. 5, is to omit the fuel rods of the central zone, for example, at the central rod and of the two inner rings of rods. A second, likewise circular-cylindrical inner guide tube 41 is then provided for the flow configuration. The interior thereof can then contain, for example, a control element 6 formed of absorber material or an additional breeder element 7. The entire core of the reactor can consequently be constructed of identical fuel assemblies.

In this connection, it should be noted that if the boxes have the shape of circular cylinders, the head piece and carrier or base member of the fuel assemblies can be formed especially simply as turned parts whereas, in the case of hexagonal fuel assemblies, complex transitions between the hexagonal cluster and the round connecting parts had to be effected.

In summary, it can be concluded that the circular fuel assembly according to the invention of the instant application is less expensive and simpler to fabricate than the conventional hexagonal assembly heretofore; that the thickness of the box or chest wall and, thus, the steel content of the assembly are considerably smaller than in the hexagonal fuel assembly; and that the matching of the cooling of the inner rows of rods is less complicated and can be accomplished by the hereinaforedescribed measures. The simplest measure is that which provides a suitably large diameter of the fuel assemblies.

In conclusion, it should be mentioned that it is known from other types of nuclear reactors to use fuel assemblies with circular cross section, although, respectively, within special cooling channels. For fast nuclear reactors, however, the efforts have been to fill the entire core cross section with fuel rods leaving as few gaps as possible, for which purpose the hexagonal geometry of the individual assemblies was available. It was not realized that the constructional and manufacturing engineering as well as neutron-physical advantages of circular fuel assemblies for fast nuclear reactors more than make up for the apparent disadvantages due to the empty wedge-shaped spaces between the individual fuel assemblies. Likewise, it was not heretofore recognized that the use of such fuel assemblies prevents the occurrence of long-term damage to the boxes inhibiting the operation of the reactor.

We claim:

1. Fuel assembly for gas-cooled fast breeder nuclear reactors comprising a cluster of parallel-disposed fuel rods, and a steel casing surrounding said cluster of parallel-disposed fuel rods and defining a coolant flow configuration, the fuel rods being disposed in a manner that the axes thereof intersect imaginary coaxial circles, said casing being of circular cylindrical shape having a wall of lesser thickness than that of an hexagonal fuel-assembly casing of equal strength under like pressure and temperature stresses, so that the resultant increase in nuclear core volume of an assembly of a plurality of said circular-cylindrical fuel-assembly casings over the nuclear core volume of an assembly of hexagonal fuel-assembly casings due to a presence of wedge-shaped spaces between the circular-cylindrical fuel-assembly casings is at most equal to a consequent reduction in nuclear core volume due to a reduction in the amount of steel of the less thicker walls of the circular-cylindrical fuel-assembly casings.

2. Fuel assembly according to claim 1 comprising coolant subchannels extending in the middle of the cluster and being bordered by fuel rods of reduced output having a lower enrichment than the remaining fuel rods of the fuel assembly.

3. Fuel assembly according to claim 1 including a central guide tube disposed coaxially to the casing, and a breedermaterial element received in the interior of said central guide tube.

4. Fuel assembly according to claim 1 including a central guide tube disposed coaxially to the casing, and a control element formed of absorber material axially adjustably disposed in the interior of said central guide tube.

5. Fuel assembly according to claim 1 including coolant subchannels extending in the middle of the cluster concentrically to said circular-cylindrical casing and comprised of cylindrical guide tubes.

* * * * *